United States Patent

Caretta

3,925,141

Dec. 9, 1975

[54] MACHINE FOR MANUFACTURING PNEUMATIC TIRES, IN PARTICULAR RADIAL TIRES

[75] Inventor: Renato Caretta, Varese, Italy

[73] Assignee: Industrial Pirelli S. p. A., Milan, Italy

[22] Filed: Sept. 8, 1972

[21] Appl. No.: 287,275

[44] Published under the Trial Voluntary Protest Program on January 28, 1975 as document no. B 287,275.

[30] Foreign Application Priority Data

Sept. 14, 1971 Italy .................................. 28578/71

[52] U.S. Cl. .................. 156/416; 156/128; 156/414
[51] Int. Cl.² ........................................ B29H 17/16
[58] Field of Search ........... 156/110, 123, 132, 133, 156/135, 398, 400–402, 414–416

[56] References Cited
UNITED STATES PATENTS

| | | | |
|---|---|---|---|
| 1,405,470 | 2/1922 | Wheatley | 156/123 |
| 1,654,351 | 12/1927 | Steinle | 156/123 |
| 3,017,919 | 1/1962 | McMahon et al. | 156/400 |
| 3,047,450 | 7/1962 | Drakeford et al. | 156/415 |
| 3,107,192 | 10/1963 | McNenney | 156/416 |
| 3,433,695 | 3/1969 | Caretta | 156/415 |
| 3,580,766 | 5/1971 | Pacciarini et al. | 156/123 |
| 3,580,782 | 5/1971 | Leblond | 156/415 |
| 3,607,558 | 9/1971 | Neboot | 156/415 |
| 3,674,604 | 5/1972 | Gazoit | 156/415 |

*Primary Examiner*—Douglas J. Drummond
*Assistant Examiner*—John E. Kittle
*Attorney, Agent, or Firm*—Stevens, Davis, Miller & Mosher

[57] ABSTRACT

A machine for building pneumatic tires including an expansible type drum having two shoulders to support the carcass zones on the bead cores; an expansible helical spring associated with each shoulder to oppose the axial components of thrusts directed towards the interior of the carcass generated by the shaping of the carcass and two bells which face each other and have an inner profile axially narrower than the freely shaped carcass. The bells extend radially for a portion of the height of the section of the completely shaped carcass and abut the carcass sides during the shaping thereof. The bells may be provided with a projection one portion of which is an annular band having an outer diameter substantially equal to the outer diameter of the carcass at the end of its free shaping and a width such as to leave on the shaped carcass an axial gap astride the middle plane of the drum whose width is less than the width of the tread and the breaker. As an alternative embodiment to projections on the bell there may be opposing flanges supporting annular bands in which the flanges are moveably positioned axially outside the bells. The expansible helical spring is expanded radially by bringing together two conical surfaces and correspondingly contacted by separating the two conical surfaces.

1 Claim, 8 Drawing Figures

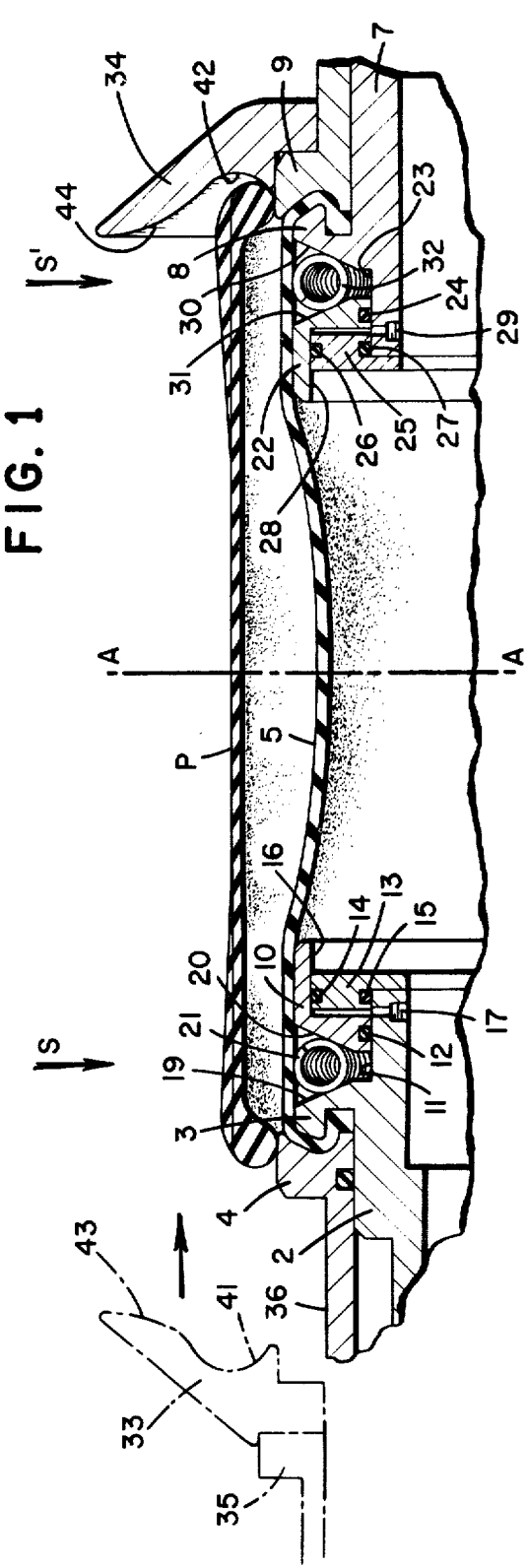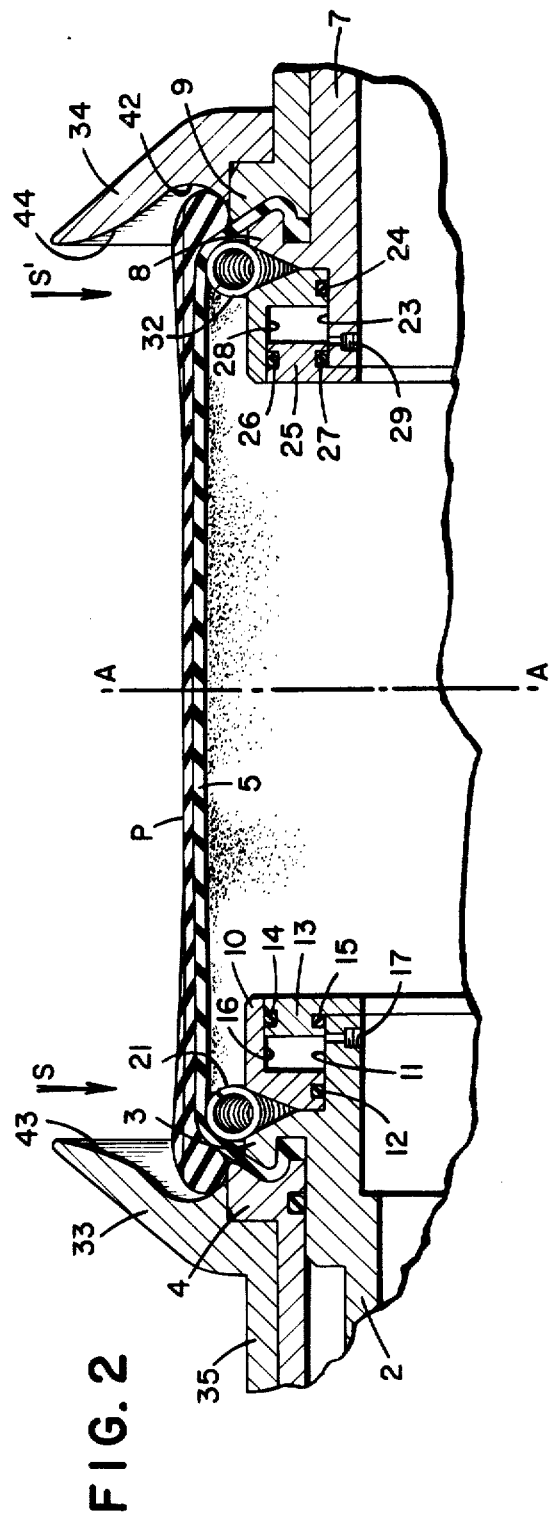

MACHINE FOR MANUFACTURING PNEUMATIC TIRES, IN PARTICULAR RADIAL TIRES

The present invention relates to the manufacture of pneumatic tires and in particular to the manufacture of radial tires, in which the carcass is shaped, i.e., brought to a toroidal form very near to that of the finished tire, before the application of the tread and, if necessary, of the breaker.

U.S. Pat. No. 3,580,766 describes a method and machine of the expansible drum type for shaping a tire carcass in which the shaped carcass is subjected to a slight axial squeezing at the portion of the carcass concerned with the bead cores in the direction of the median plane of the carcass. Moreover, the thrusts generated by the shaping operation, whose axial components are directed towards said median plane of the carcass at the portions of the carcass concerned with the bead cores are opposed. The machine is provided with two opposing bells, which are equal to each other and have a toroidal inner profile which is axially narrower than the theoretical outer profile of the freely shaped carcass. These bells together form a width of the shaped carcass from a zone near the beds to the top portion of the carcass. The bells are mutually movable in a direction toward and away from each other.

The machine provides means capable of taking up the axial components of the thrusts. These means are situated inside the carcass and able to assume alternatively a diameter smaller and a diameter greater than the inner diameter of the carcass beads. The means comprise a series of two sectors, each oscillating about a pivot inserted in a fork-shaped support integral with the corresponding shoulder of the drum. Each of said sectors is provided with a shank one end of one of which is inserted in the annular recess of an annular element, coaxial with the drum shoulders and slidable axially in both directions on an annular surface of the drum.

The present invention has the same purposes as U.S. Pat. No. 3,580,766, namely to ensure the exact centering of the tread and of the breaker on the shaped carcass, and to maintain the portions of the carcass near the bead cores well fixed in the appropriate seats obtained in the drum shoulders. The present invention has as its purpose to eliminate the irregular mutual slidings between the carcass ply or plies and the bead cores in particular bead cores of the open-scheme type, and more particularly, these bead cores in radial tires provided with a single-ply carcass.

The structure of the tire beads can be of two types, i.e., "open-scheme" beads and "close-scheme" beads. In the open-scheme beads, the plies are wound up on the drum in a cylindrical form and the bead cores are applied on them at the drum shoulders; then the skirtings of all the plies which project from the bead cores are wound up on the latter at the external surface of the drum, i.e., at the part opposite to that of the axis of the drum itself. In the close-scheme bead structure, some plies are placed on said turn-ups, and these new plies are wound towards the radially inner surface after the removal of the carcass from the drum. It is evident, that for the close-scheme beads it is necessary to use at least two carcass plies, while for open-scheme beads one can utilize a single-ply carcass.

Nowadays, the open-scheme beads are more largely used, in particular for radial tires, owing to their easier construction.

However, open-scheme beads show a disadvantage due to the fact that, during the subsequent shaping operation, the carcass is subjected to tensions in its zone nearest to the bead cores, since its shape which is initially cylindrical, i.e., a shape developable on a plane, becomes toroidal, i.e., shape not developable on a plane. With a toroidal shape irregular mutual slidings between the carcass ply, or plies, and the bead cores do occur. Such slidings may assume a proportion often not acceptable in single-ply carcasses of radial tires.

Accordingly, the object of the present invention is to provide a machine for building pneumatic tires and especially radial tires which overcomes the above disadvantages. Briefly summarized the machine of the present invention includes a drum of the expansible type comprising two shoulders which can be moved relatively toward and away from each other and which support the carcass at zones concerned with the bead cores; means to nullify the axial components of the thrusts, directed towards the carcass inside, which thrusts are generated during the shaping of the carcass; and two bells, facing each other and having an inner profile axially narrower than that of a freely shaped carcass. The machine is further characterized in that the bells extend radially for only a portion of the height of the section of the completely shaped carcass with the carcass sides abutting the inner profile of the bells during the shaping of the carcass.

The improvements which, according to the present invention, are made to the machine described in U.S. Pat. No. 3,580,766 will be more clearly understood from the following description, given by way of non-limiting example and made with reference to the attached drawings, in which:

FIGS. 1 to 4 illustrate four steps in the manufacture of a radial tire in which the machine is represented only diagrammatically and partially for the sake of clearness;

Figure 3:
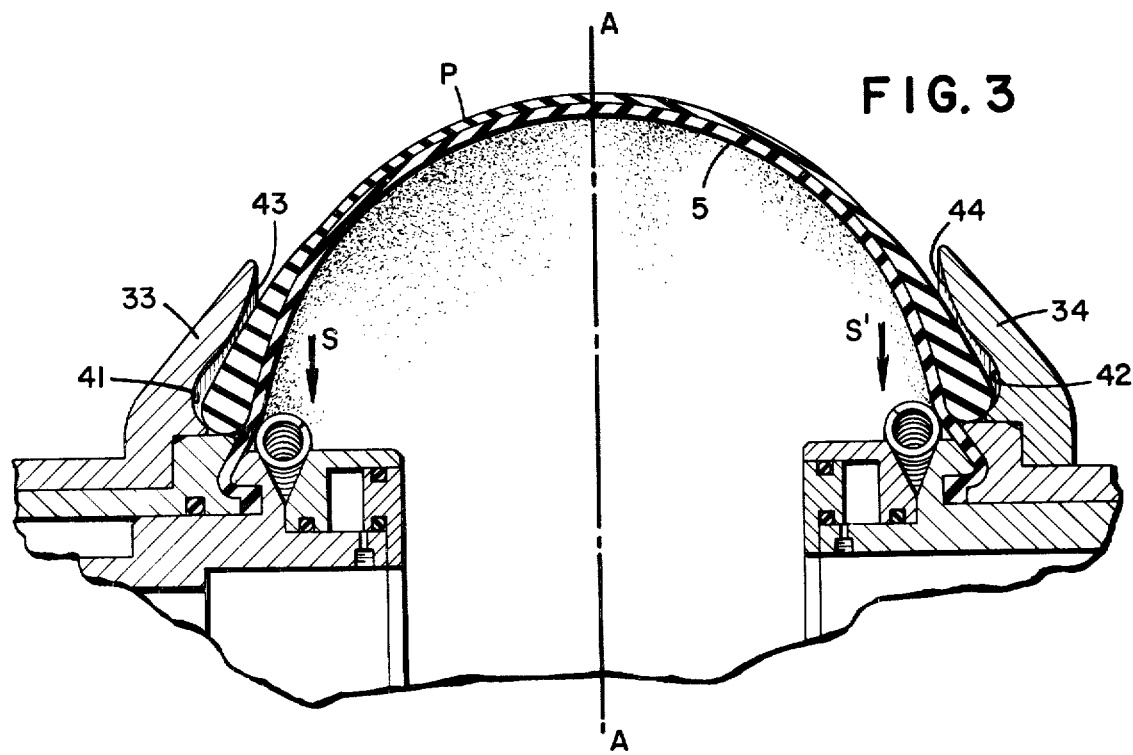
Figure 4:
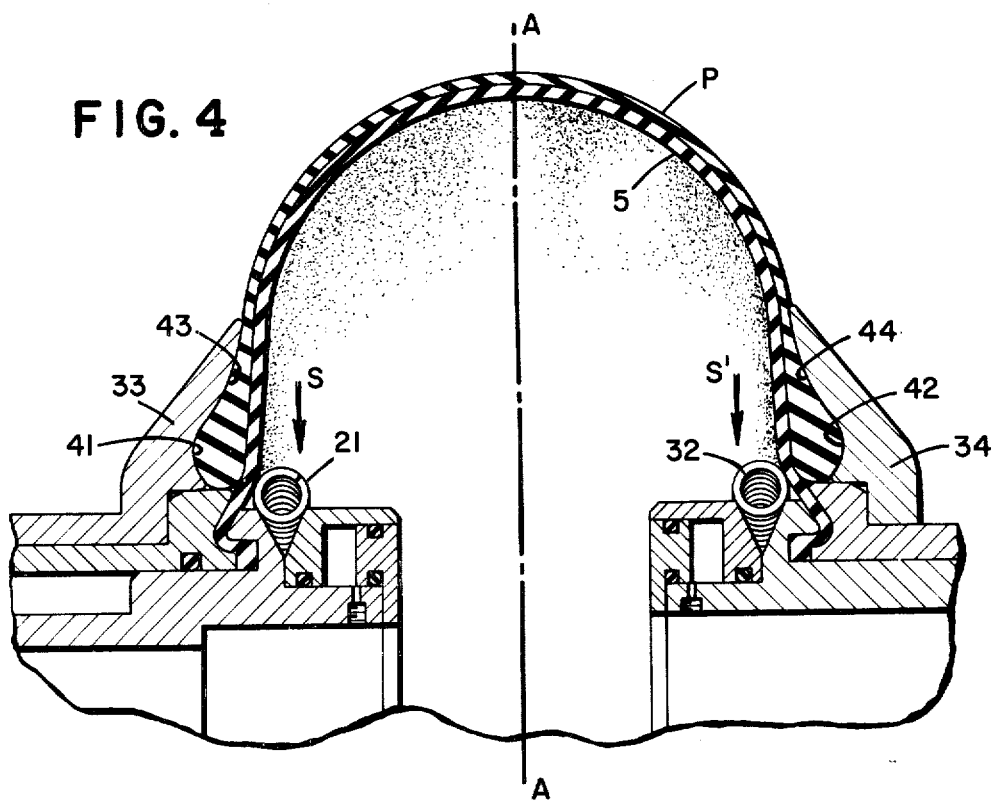

In the figures, a cantilever shaft 1 is rotated about its own axis. The shaft, at its free end, is fastened to a hub 2, provided with a flange 3 which, together with a mandrel 4, forms a part of shoulder S of the building drum. One edge of a non-reinforced rubber membrane 5 is tightly clamped between flange 3 and mandrel 4. Shaft 1 carries a hollow mandrel 6, (FIG. 5) which can slide longitudinally on it but is made fast to it during rotation by means of a key, not represented.

Figure 5:
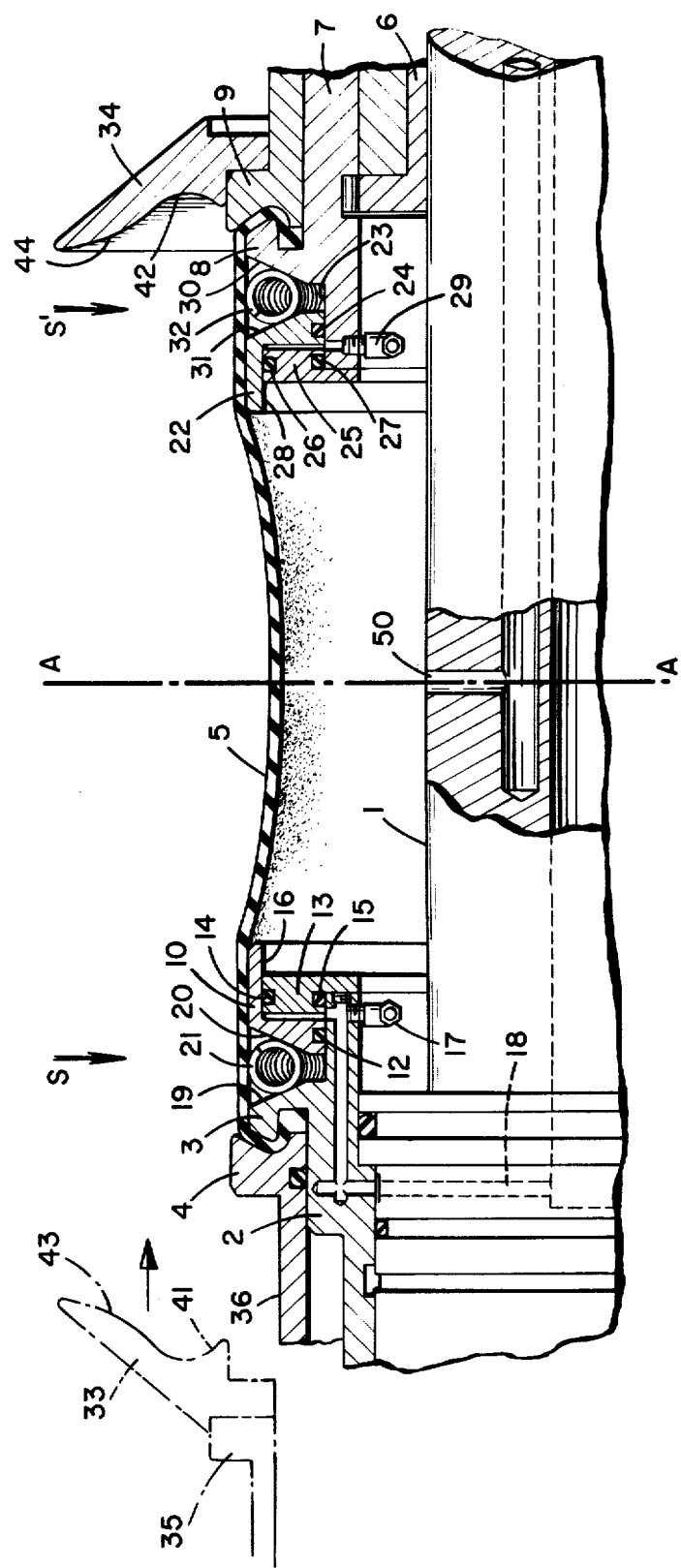
FIG. 5 illustrates a section of the machine, taken along a plane passing through the drum axis; said section being taken with the drum in rest position.

The hollow mandrel 6 is integral with a hub 7, provided with a flange 8 which, together with a mandrel 9, forms a part of shoulder S' of the building drum. The other edge of membrane 5 is tightly clamped between flange 8 and mandrel 9. Membrane 5 can be inflated in a conventional manner by admitting compressed air into its inside through the small channel 50 (FIG. 5). The source of air is not illustrated.

The relative longitudinal movement of shaft 1 and mandrel 6 which brings about the relative movement of drum shoulders S and S' toward and away from each other, takes place in a known way, for instance as described in U.S. Pat. No. 3,409,490.

Shoulder S comprises also ring 10, having the same outer diameter as flange 3. Ring 10 is slidable on the surface 11 of hub 2. Tightly secured on the latter surface is an O-ring 12. When the drum is in a position of rest as shown in FIG. 5, a small axial hollow space exists between the front part of ring 10, facing the midline A—A of the drum and a ring 13 which, by means of a plurality of stud bolts, not illustrated, is secured to hub 2 and therefore to flange 3. Ring 13 contains two O-rings 14 and 15, which are tightly secured, respectively, on the surface 16 of ring 10 and on the surface 11 of hub 2. Hub 2 is provided with a small channel 17, which is connected with another small channel 18 provided on shaft 1, and which permits the injection of compressed air from a source, not illustrated between ring 10 and ring 13. Flange 3, in its part facing towards the midline A—A of the drum, has a conical surface 19, which faces the conical surface 20 of ring 10.

The conical surfaces 19 and 20 define a groove encasing an annular element, which can be expanded radially; this element is constituted of a helical spring 21, closed as a ring and mounted under tension.

In a manner quite symmetrical with respect to shoulder S, shoulder S' comprises also a ring 22, slidable on the surface 23 of hub 7, on which is tightly secured an O-ring 24.

When the drum is in rest position, a small axial hollow space exists between the front part of ring 22, facing the midline A—A of the drum, and a ring 25 which, by means of a plurality of stud bolts, not illustrated, is made fast to hub 7 and therefore to flange 8. Ring 25 contains O-rings 26 and 27, which are tightly secured, respectively, on the surface 28 of ring 22 and on the surface 23 of hub 7. Hub 7 is provided with a small channel 29, which is connected, through the small channel 18, with a source of compressed air. By way of channel 18 and 29 compressed air can be injected between ring 22 and ring 25. Flange 8, in its part facing the midline A—A of the drum, has a conical surface 30, which faces the conical surface 31 of ring 22. The conical surfaces 30 and 31 define a groove encasing a spring 32, identical to spring 21.

Owing to the presence of O-rings 14 and 15 in shoulder S and of O-rings 26 and 27 in shoulder S' of the building drum, the compressed air injected through the small channels 17, 18 and 29, connected to one another by means of a flexible hose, not illustrated, remains inside said axial hollow spaces. Ring 10 acts as the piston of a single-acting cylinder, as it slides axially with respect to the "body" constituted by ring 13 and by hub 2. The same happens for ring 22 with respect to ring 25 and to hub 7. Consequently, rings 10 and 22 are displaced away from the midline A—A of the drum, i.e., respectively, towards flange 3 and flange 8, so that the two grooves encasing springs 21 and 32 are reduced in their section. The coils of the springs are not "squashed", since the springs are put under tension at the time of assembling of the machine. On the contrary, they are forced to expand radially by sliding respectively on the conical surfaces 19 and 20, 30 and 31, (FIG. 2). By releasing compressed air from said hollow spaces, rings 10 and 22 reverse the direction of their axial sliding, approaching again to the middle plane A—A, by virtue of the tension accumulated by springs 21 and 32, which latter resume their initial shape (FIG. 5), i.e., their minimum diameter.

Two opposing bells 33 and 34 are mounted at the two sides of the building drum. Bell 33 is integral with a hollow mandrel 35 coaxial with the drum and slidable, for a certain length, along the outer surface 36 of mandrel 4, toward and away from the corresponding shoulder S of the building drum. Bell 34 is rigidly fastened to mandrel 9 by means of stud belts, not illustrated.

The inner profile of bells 33 and 34 is axially narrower, on the order of a few millimeters, than the theoretical outer profile of the freely shaped carcass. Contrary to what is described in U.S. Pat. No. 3,580,766, said inner profile comprises for both of the bells, a radially inner part, respectively 41 and 42, which has a concavity directed towards the midline A—A of the drum, and a radially outer part, respectively 43 and 44, which has a concavity directed towards the part opposite to the midline A—A, said latter concavity having a somewhat greater bending radius. Moreover, the maximum diameter of the bells inner profile is such that it extends only to approximately one half of the section of the shaped carcass.

Figure 7:
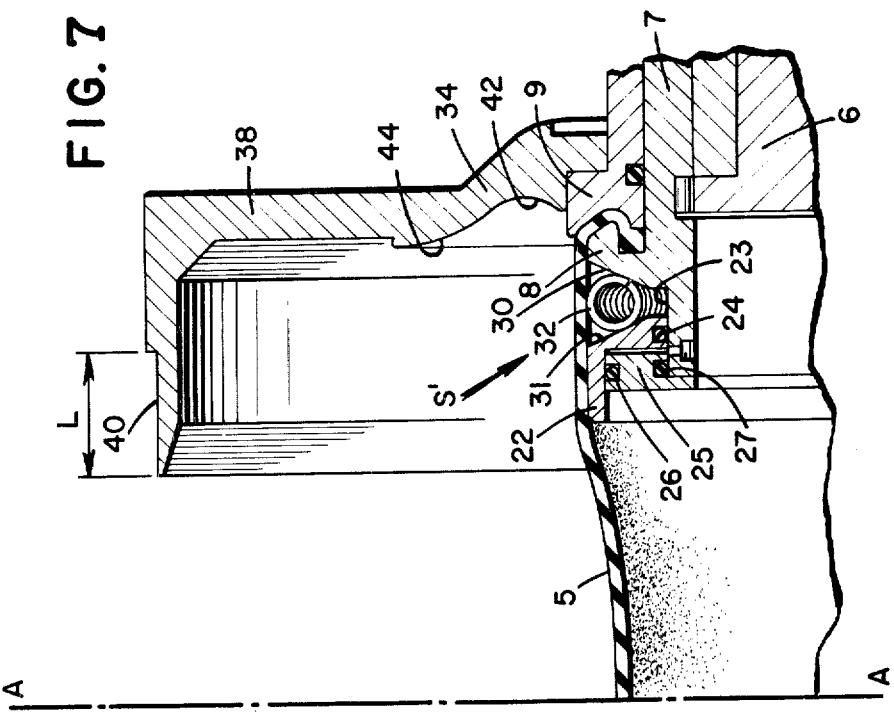
FIG. 7 illustrates the right side of the embodiment of FIG. 6 with the drum in the rest position.
Figure 6:
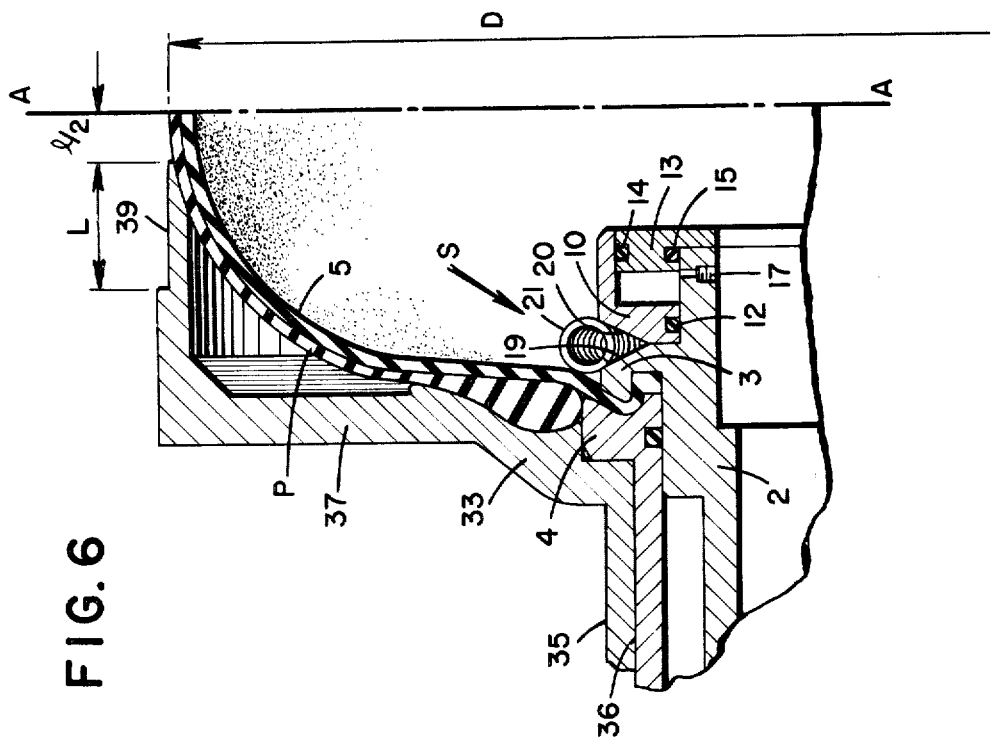
FIG. 6 illustrates an alternative embodiment of the invention, taken along a longitudinal section and, for reasons of symmetry, illustrating only the left side of the drum at the end of the shaping of the carcass.

According to the embodiment of FIGS. 6 and 7, each of the bells 33 and 34 is provided with a projection, respectively 37 and 38, which separates from the shaped carcass at the point where the inner profile of the bells terminates. Thus, they comprise an annular band, respectively 39 and 40. The outer diameter of said annular bands 39 and 40 is substantially equal to the outer diameter D of the completely shaped carcass, while their width L is such as to leave, on the freely and completely shaped carcass, an axial gap astride the middle plane A—A of the building drum. The width $l$ of the axial gap is smaller than the width of the tread and of the possible breaker, which are to be applied to the shaped carcass. Usually, the width of the breaker is just $2L + l$, and that of the tread is slightly greater.

Figure 8:
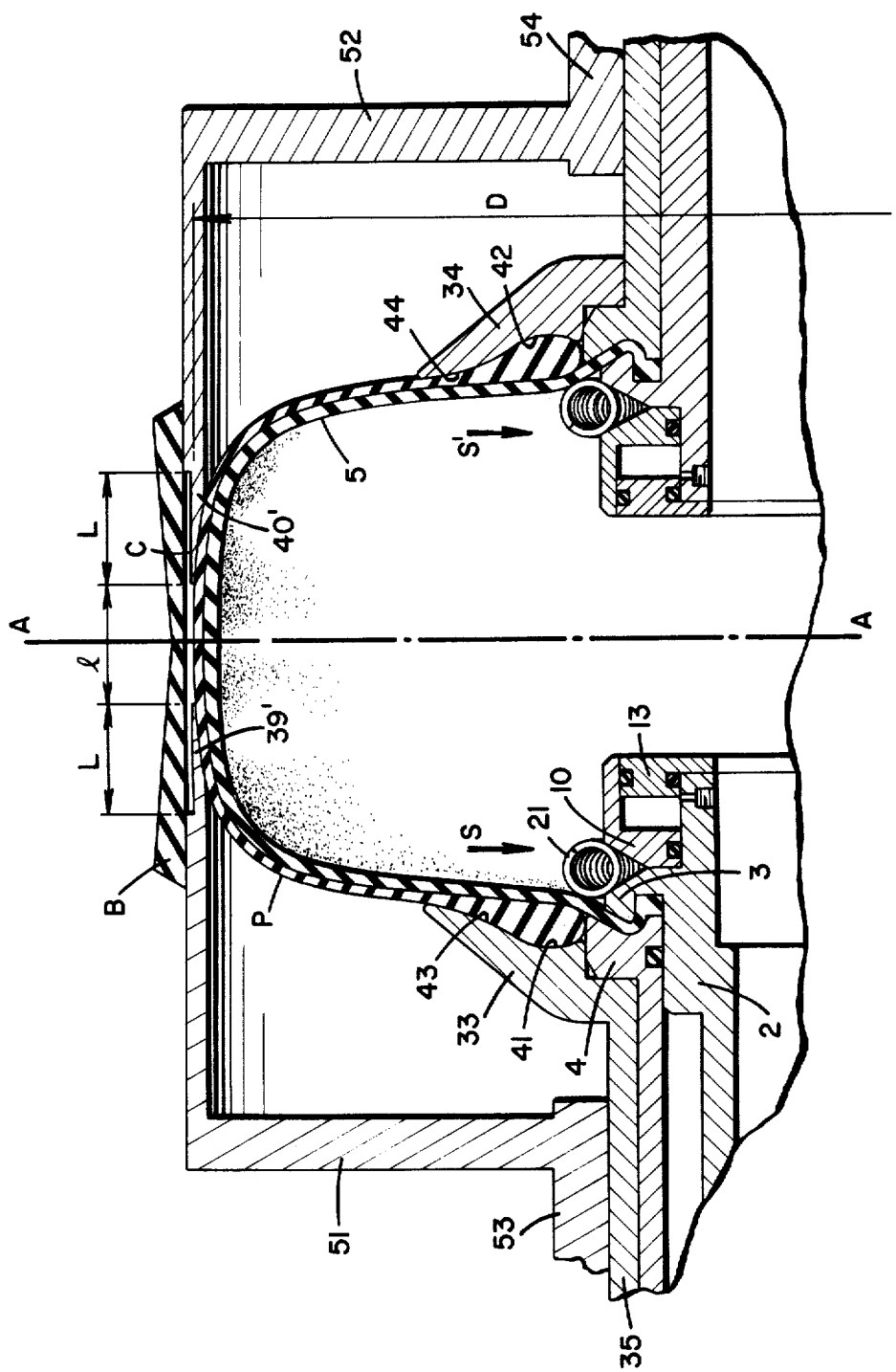
FIG. 8 represents a further alternative embodiment of the invention, taken along a longitudinal section showing the carcass at its maximum shaping.

A further embodiment is shown in FIG. 8 which substantially differs from the above described ones in that the bells 33 and 34 are devoid of projections 37 and 38 but have annular bands 39' and 40' of a width L. Bands 39' and 40' are supported by two flanges 51 and 52, fastened to the ends of two hollow mandrels 53 and 54, coaxially positioned on the building drum and situated outside shoulders S and S'. Mandrels 53 and 54 can be caused to rotate and to slide axially together toward shoulders S and S' of the building drum, together with bells 33 and 34, or independently of them.

The flanges 51 and 52 can slide towards midline A—A only as far as to leave an axial gap or $l$ width along diameter D of the freely and completely shaped carcass. Beyond that position, shoulders S and S', together with bells 33 and 34, can be moved closer together by continuing to admit compressed air into membrane 5, while flanges 51 and 52 separate from each other along with the hollow mandrels 53 and 54. In such a way the carcass reaches a sort of "over-shaping" if the tire is provided with a breaker, for instance if it is a radial tire.

The shaping of carcass P of a radial tire, made on this machine and in accordance with the present invention, is carried out in several phases, each of which is illustrated in one of FIGS. 1 to 4. Obviously, these phases are not actually distinct from one another but follow one another without interruption.

By way of a non-limiting example, carcass P is built up, into a cylindrical shape, on another building machine, of the rigid drum type. However, the machine of the present invention could be used to carry out both the building of the carcass in a cylindrical form and its shaping to a toroidal form.

In the first phase (FIG. 1) to insert carcass P around the expansible drum, bell 33 is detached from shoulder S and is displaced to the left, together with the hollow mandrel 35. Bell 34 is in contact with the right bead of carcass P at the radially inner part 42 of its inner profile which is the nearest to flange 9. In this first phase, membrane 5 is in condition of maximum contraction, so that no contact exists between its outer surface and the inner surface of carcass P. Springs 21 and 32 are in condition of minimum diameter, since the grooves encasing them have a maximum section. The inner surface of membrane 5 is in contact with springs 21 and 32.

In the second phase (FIG. 2) bell 33 is moved toward shoulder S until it touches the left bead of carcass P at the radially inner part 41 of its inner profile which is the nearest to mandrel 4. The approach of bell 33 is effected by displacing the hollow mandrel 35 to the right. Springs 21 and 32 are then brought to their condition of maximum diameter by reducing the section of the grooves encasing them through the admission of compressed air through the small channels 17, 18 and 29. In this way, the outer surface of membrane 5 is forced into complete contact with the inner surface of carcass P.

The beads of carcass P are locked from the inside by means of springs 21 and 32, while most of the inner profiles of bells 33 and 34 are still separated from carcass P.

In the third phase (FIG. 3) the inside of membrane 5 is put into communication with the first source of compressed air through small channel 50 (FIG. 5). At the same time shaft 1 and mandrel 6 slide longitudinally in opposite directions with respect to each other, so that shoulders S and S' are brought toward each other. The progressive expansion of membrane 5 originates the progressive shaping of carcass P, since the outer surface of the membrane 5 exerts a thrust on the inner surface of carcass P.

The inner profiles of bells 33 and 34 are not yet abutting against the sides of carcass P, so that the shaping of the latter can freely go on.

In the fourth phase (FIG. 4) the inner profiles of bells 33 and 34 abut against the sides of carcass P, the maximum diameter of the bells being approximately one half of the height of the tire section. The very moment in which the inner profiles of bells 33 and 34 abut against the sides of carcass P can be that in which the carcass has reached its maximum free shaping. Alternatively, this may occur when the carcass must be still subjected to a partial shaping, according to the method which will be explained hereinafter. Then the breaker and the tread band are applied and stitched by means of any of the methods already known to the technicians of this field.

The tire built up in this way is removed from the drum after having springs 21 and 32 returned to their condition of minimum diameter, and after having returned the drum to its position of rest, by discharging compressed air from the inside of membrane 5.

To remove the manufactured tire from the building-up machine, bell 33 is separated from shoulder S by sliding hollow mandrel 35 to the left.

The solutions described in the present invention have proved very efficient to overcome the above indicated disadvantages ascertained in the manufacture of tires provided with open-scheme beads.

The mutual slidings between the carcass ply or plies and the bead cores are completely eliminated by providing that the inner profiles of the bells begin to abut against the carcass sides shortly before completing the shaping operation. Even more advantageous has been the adoption of bells which extend radially for approximately one half of the section of the completely shaped carcass, in combination with the shaping in two parts of their inner profiles. In this way, it is possible to ensure a perfect centering of the tread and of the breaker on the underlying shaped carcass, since the latter is not clamped by the bells at its radially outermost portion, namely where the carcass comprises only one or more plies. In this portion the cords of the plies are free to take a correct arrangement along pre-established lines of maximum resistance, by virtue of the shaping. Thus it is possible to eliminate any irregularities which may have occurred in the previous processing of the plies and in the first phase of the building operation.

In this regard, it is to be taken into account that the annular bands of the projections provided on the bells in the alternative embodiment (FIGS. 6 and 7) do not press on the parts of the carcass, but further facilitate the correct centering of the breaker and of the tread.

As regards the radially expansible springs, it is clear that they, owing to their simple construction and function, carry out the task of contrasting the axial component of the thrust exerted by the beads towards the drum midline, due to the shaping operation, much better than the rotating sectors described in U.S. Pat. No 3,580,766. As previously stated, it is possible to have the inner profiles of the bell begin to abut against the carcass sides before the shaping operation is freely completed. Moreover, it is preferable that the instant in which this abutment takes place coincides with that in which the thrust exerted by the carcass beads reverses its own direction, i.e., becomes directed in a sense opposite to the drum midline A—A. In this situation, it is possible to bring the springs again to their condition of minimum diameter, while the shaping of the carcass has not yet been completed.

As regards the over-shaping which can be imparted to the carcass when the machine is made according to the alternative embodiment of FIG. 8, it is carried out after the application of the breaker C and of the tread B, but before the final stitching operation. It is evident that these elements adhere to carcass P only at the axial interval, comprised between the annular bands 39' and 40', which has a width 1 somewhat smaller than theirs, but sufficient to prevent a radial expansion of carcass P beyond diameter D. At this moment flanges 51 and 52 are detached from each other, while compressed air is still admitted inside the membrane 5; at the same time shoulders S and S', together with bells 33 and 34, are closer together.

In this way a considerable reduction in the bending radiuses of the carcass sides is obtained. This fact is facilitated by the above indicated shaping in two parts of the inner profiles of bells 33 and 34, and permits a carcass P to be nearly flattened below the lateral portions of the breaker and of the tread which have not yet been adhered to carcass P, that is a carcass very near to the final toroidal shape.

Then the breaker C and the tread B are stitched in the conventional way to obtain the adhesion to the carcass of their remaining parts, situated at the sides of the axial gap. This adhesion can easily take place, since the carcass is nearly flattened, and consequently the rubberized fabrics constituting the breaker C are not damaged in any way.

Even if the present description is limited to alternative embodiments of the invention, the building machine can be operated in other ways derived from the concepts of the present invention without departing from the field of the invention itself.

For instance, the radially expansible springs can be eliminated if the membrane contains appropriate inextensible reinforcements in its portions nearest to the two ends.

The machine can be provided with a drum of the type comprising expansible rigid sectors which permit the building up and shaping of a radial tire on a single machine. On the other hand, if the carcass to be shaped and in case to be built up is impermeable, such as for a "tubeless" type, the expansible membrane can be omitted.

What is claimed is:
1. An expansible type drum machine for building pneumatic tires comprising
   two shoulders to support the carcass zones concerned with the bead cores, said shoulders being movable relative to each other in an axial direction;
   means for admitting a fluid under pressure inside the drum during the shaping of the carcass;
   a helical spring, for each drum shoulder, closed as a ring and mounted under tension, each of said drum shoulders defining a groove of conical surfaces, facing each other, and being formed of two elements forming a part of the corresponding drum shoulder, said elements slidable axially relatively to each other so as to vary the width of said groove and cause the expansion and the contraction of the helical spring, and
   two bells, facing each other and having an inner profile axially narrower than that of the freely shaped carcass, said bells extending radially for a portion of the height of the section of the completely shaped carcass, and abutting the carcass sides on the inner profiles thereof during the shaping of the carcass.

* * * * *

UNITED STATES PATENT AND TRADEMARK OFFICE
CERTIFICATE OF CORRECTION

PATENT NO. : 3,925,141
DATED : December 9, 1975
INVENTOR(S) : Renato Caretta

It is certified that error appears in the above–identified patent and that said Letters Patent are hereby corrected as shown below:

Item [73] Assignee: Industrie Pirelli S.p.A., Milan, Italy

Signed and Sealed this thirteenth Day of April 1976

[SEAL]

Attest:

RUTH C. MASON
Attesting Officer

C. MARSHALL DANN
Commissioner of Patents and Trademarks